(12) United States Patent
Amir et al.

(10) Patent No.: US 8,599,851 B2
(45) Date of Patent: Dec. 3, 2013

(54) SYSTEM AND METHOD THAT ROUTES FLOWS VIA MULTICAST FLOW TRANSPORT FOR GROUPS

(75) Inventors: Yair Amir, Bethesda, MD (US); Jonathan Stanton, Chevy Chase, MD (US); Michal Miskin-Amir, Bethesda, MD (US); John Lane Schultz, Lutherville, MD (US)

(73) Assignee: LTN Global Communications, Inc., Savage, MD (US)

( * ) Notice: Subject to any disclaimer, the term of this patent is extended or adjusted under 35 U.S.C. 154(b) by 654 days.

(21) Appl. No.: 12/753,459

(22) Filed: Apr. 2, 2010

(65) Prior Publication Data
US 2011/0243131 A1 Oct. 6, 2011

(51) Int. Cl.
*H04L 12/28* (2006.01)

(52) U.S. Cl.
USPC ........................ 370/390; 370/395.31; 709/238

(58) Field of Classification Search
USPC .......................................... 370/390; 709/328
See application file for complete search history.

(56) References Cited

U.S. PATENT DOCUMENTS

| | | | |
|---|---|---|---|
| 4,672,543 A | 6/1987 | Matsui et al. | |
| 5,664,091 A | 9/1997 | Keen | |
| 5,892,910 A | 4/1999 | Safadi | |
| 6,467,008 B1 | 10/2002 | Gentry, Jr. et al. | |
| 6,493,316 B1 | 12/2002 | Chapman et al. | |
| 6,611,872 B1 * | 8/2003 | McCanne | 709/238 |
| 6,694,469 B1 | 2/2004 | Jalali et al. | |
| 6,901,445 B2 | 5/2005 | McCanne et al. | |
| 7,042,869 B1 | 5/2006 | Bender | |
| 7,080,157 B2 * | 7/2006 | McCanne | 709/238 |
| 7,096,281 B2 | 8/2006 | Brabson et al. | |
| 7,133,928 B2 * | 11/2006 | McCanne | 709/238 |
| 7,206,280 B1 | 4/2007 | Khan et al. | |
| 7,289,441 B1 | 10/2007 | Barach | |
| 7,289,520 B2 | 10/2007 | Xu et al. | |
| 7,340,505 B2 | 3/2008 | Lisiecki et al. | |
| 7,415,527 B2 | 8/2008 | Varadarajan et al. | |
| 7,483,439 B2 | 1/2009 | Shepherd et al. | |
| 7,532,621 B2 | 5/2009 | Birman et al. | |
| 7,567,515 B2 | 7/2009 | Shen | |
| 7,643,426 B1 | 1/2010 | Lee et al. | |

(Continued)

FOREIGN PATENT DOCUMENTS

GB 2478397 A 9/2011

OTHER PUBLICATIONS

International Search Report issued on Jun. 3, 2010 in PCT/US2010/029977.
Written Opinion issued on Jun. 3, 2010 in PCT/US2010/029977.

(Continued)

*Primary Examiner* — Hassan Kisou
*Assistant Examiner* — Emmanuel Maglo
(74) *Attorney, Agent, or Firm* — Venable LLP; Robert S. Babayi

(57) ABSTRACT

A routing system and method for flows within a network provides multicast flow transport for one or more groups. Transit routers comprising processing units that run overlay processes route one or more flows based on overlay group identifiers. Access nodes issue requests for overlay groups in order to receive flows from the transit routers. The overlay processes utilize a mapping service that maps overlay group identifiers to native multicast group identifiers. A control channel between the access nodes and transit routers is used for communicating access nodes requests, overlay group identifiers, and native multicast group identifiers.

11 Claims, 13 Drawing Sheets

(56) References Cited

U.S. PATENT DOCUMENTS

| | | | |
|---|---|---|---|
| 7,733,868 B2 | 6/2010 | Van Zijst | |
| 7,734,730 B2 | 6/2010 | McCanne | |
| 7,761,767 B2 | 7/2010 | Chandra et al. | |
| 7,778,165 B2 | 8/2010 | Madhyastha et al. | |
| 7,792,915 B2 | 9/2010 | Berkey et al. | |
| 7,839,798 B2 | 11/2010 | Tang et al. | |
| 8,117,328 B2 | 2/2012 | Choi et al. | |
| 8,181,210 B2 | 5/2012 | Amir et al. | |
| 8,196,205 B2 | 6/2012 | Gribble et al. | |
| 2002/0064167 A1 | 5/2002 | Khan et al. | |
| 2003/0088696 A1* | 5/2003 | McCanne | 709/238 |
| 2003/0120917 A1 | 6/2003 | Itonaga et al. | |
| 2003/0147371 A1 | 8/2003 | Choi et al. | |
| 2004/0010616 A1* | 1/2004 | McCanne | 709/238 |
| 2004/0098502 A1 | 5/2004 | Xu et al. | |
| 2005/0015511 A1 | 1/2005 | Izmailov et al. | |
| 2005/0058149 A1 | 3/2005 | Howe | |
| 2005/0198290 A1 | 9/2005 | Berkey et al. | |
| 2005/0289623 A1 | 12/2005 | Midani et al. | |
| 2006/0167784 A1 | 7/2006 | Hoffberg | |
| 2006/0268871 A1 | 11/2006 | Van Zijst | |
| 2007/0028002 A1* | 2/2007 | McCanne | 709/238 |
| 2007/0162945 A1 | 7/2007 | Mills | |
| 2007/0168825 A1 | 7/2007 | Jalali et al. | |
| 2007/0223495 A1 | 9/2007 | Fukui | |
| 2007/0230352 A1 | 10/2007 | Kokku et al. | |
| 2008/0098450 A1 | 4/2008 | Wu et al. | |
| 2008/0134258 A1 | 6/2008 | Goose et al. | |
| 2008/0140853 A1 | 6/2008 | Harrison | |
| 2008/0209297 A1 | 8/2008 | Chandra et al. | |
| 2008/0215681 A1 | 9/2008 | Darcie et al. | |
| 2009/0207840 A1* | 8/2009 | McCanne | 370/390 |

OTHER PUBLICATIONS

Awerbuch, Baruch et al: "Throughout-Competitive On-Line Routing" to appear in Proc. 34'th Conf. on Found. of Computer Science, Oct. 1993.

Birman, K. et al., "*Exploiting Virtual Synchrony in Distributed Systems*", Proceedings of the ACM Symposium on Operating Systems Principles, pp. 123-128, Nov. 1987.

Francis, Paul, "Yoid: Extending the Internet Multicast Architecture.", in a Technical Report dated Apr. 2000.

Moser, L.E. et al., "*Extended Virtual Synchrony*", in Proceedings of the IEEE International Conference on Distributed Computing Systems, pp. 56-65, Jun. 1994.

Yair Amir et al: "1-800-OVERLAYS: Using Overlay Networks to Improve VpIP Quality", NOSSDAV'05, Jun. 13-14, 2005, Stevenson, Washington, USA. Copyright 2005 ACM 1-58113-987-X/05/0006.

Yair Amir et al: "Performance and Functionality in Overlay Networks", by Claudia Danilov Baltimore, Maryland Sep. 2004.

Zhang et al. "Universal IP Multicast Delivery", Computer Networks, special issue of on Overlay Distribution Structures and Their Applications, Apr. 2006.

Zhang et al. "Universal IP Multicast Delivery", Fourth International Workshop on Networked Group Communication (NGC), vol. 51, issue 1, pp. 31-42, Oct. 2002.

Amir et al., "N-way Fail-Over Infrastructure for Reliable Servers and Routers", IEEE Dependable Systems and Networks, Jun. 2003, pp. 403-412.

International Search Report and Written Opinion mailed Nov. 24, 2009 issued in PCT/US2009/051279.

International Search Report of International Application No. PCT/US2009/069238 dated Mar. 1, 2010.

Notice of Allowance issued in U.S. Appl. No. 12/537,582 dated Apr. 11, 2012.

Notice of Allowance issued in U.S. Appl. No. 12/537,582 dated Feb. 13, 2012.

Notice of Allowance issued in U.S. Appl. No. 12/644,796 dated Jan. 11, 2013.

Office Action issued in U.S. Appl. No. 12/506,725 dated Dec. 4, 2012.

Office Action issued in U.S. Appl. No. 12/506,725 dated Jun. 29, 2012.

Office Action issued in U.S. Appl. No. 12/506,725 dated Oct. 26, 2011.

Office Action issued in U.S. Appl. No. 12/537,582 dated Jun. 13, 2011.

Office Action issued in U.S. Appl. No. 12/537,582 dated Oct. 19, 2011.

Office Action issued in U.S. Appl. No. 12/537,582 dated Oct. 28, 2010.

Office Action issued in U.S. Appl. No. 12/644,796 dated Aug. 3, 2011.

Office Action issued in U.S. Appl. No. 12/644,796 dated Jan. 3, 2012.

Office Action issued in U.S. Appl. No. 12/644,796 dated Jul. 26, 2011.

Okada et al., "A Cooperative Routing Method for Multiple Overlay Networks". (Consumer Communications and Networking Conference, Jan. 10-13, 2009, CCNC, 6th IEEE).

\* cited by examiner

SYSTEM AND METHOD THAT ROUTES FLOWS VIA MULTICAST FLOW TRANSPORT FOR GROUPS

RELATED APPLICATIONS

This non-provisional application incorporates by reference the following applications in their entirety: Provisional Application Ser. No. 61/082,270, filed Jul. 21, 2008; Provisional Application Ser. No. 61/086,987, filed Aug. 7, 2008; Provisional Application Ser. No. 61/140,065, filed Dec. 22, 2008; Provisional Application Ser. No. 61/664,459, filed Apr. 3, 2009, Non-Provisional application Ser. No. 12/537,582, filed Aug. 7, 2009; Non-Provisional application Ser. No. 12/506,725, filed Jul. 21, 2009; and Non-Provisional application Ser. No. 12/644,796, filed Dec. 22, 2009.

FIELD OF THE INVENTION

The present invention generally relates to the field of network systems and more particularly to multiple logical overlay networks implemented over a physical network for transport and delivery of flows.

BACKGROUND OF THE INVENTION

Various routing schemes for delivery of end-to-end information and data over networks are known. They include broadcast, multicast, unicast and anycast. Such schemes usually attempt to deliver data from one point or node to one or more other points or nodes over a network. For example, broadcasting refers to transmitting an information packet to every node on the network and unicasting refers to transmitting information packets to a single destination node.

Multicast is a protocol for the delivery of information to a group of destinations simultaneously over the network. Generally, multicast protocols attempt to use the most efficient process to deliver messages over each link of the network only once, creating copies only when the paths to the destinations split. One implementation of multicast is Internet Protocol (IP) multicast, where routers create distribution paths for datagrams sent to a multicast destination address, while typically not guaranteeing reliability or delivery latency.

There are also other implementations of the multicast distribution strategy. Another example is Ethernet's multicast frame addresses which allow a single Ethernet frame to be delivered to multiple NICs on the same network segment while only traversing the network once. This is done by setting the destination MAC address not to any specific NIC's address, but to a special set of multicast MAC addresses which the NIC cards that are interested in a particular multicast can select to receive. Ethernet switches may duplicate the multicast frames as needed to every port that has an active NIC behind it (i.e. treat it as broadcast), or they may be configured to duplicate the multicast frame to only certain ports so that only NICs that are interested in the multicast will receive it. In both cases a multicast service can be provided by an Ethernet network without any IP network also existing.

Native multicast service is a multicast service provided by a network to a multicast group. For example, IP multicast service is native to an IP network such as the Internet. IP Multicast can scale to a large receiver population for a small number of simultaneous wide-area groups. The limit to a small number of simultaneous wide-area groups is an architectural limitation of multicast at layer 3 because the state of each group must be continually monitored leading to unsustainable overhead. Multicast utilizes network infrastructure efficiently by requiring the source to send a packet only once, even if it needs to be delivered to a large number of receivers. The routers in the network take care of duplicating the packet to reach multiple receivers only where necessary. IP Multicast utilizes such concepts as IP Multicast group addresses, multicast distribution trees and receiver driven tree creation.

IP Multicast over the Internet, however, suffers from a number of drawbacks. It is susceptible to Internet anomalies and thus unreliable. Moreover, implementation of large-scale services over the Internet via IP Multicast is problematic because it is generally not supported by Internet Service Providers (ISPs) or is only supported within a particular ISP's network and not between that network and other networks on the Internet. Other disadvantages of IP Multicast are that the assignment of group identifiers is not coordinated and that the management overhead associated with supporting many wide-area groups is not scalable.

An overlay network is a computer network that is built on top of another network. Nodes in the overlay can be thought of as being connected by virtual or logical links, each of which corresponds to a path, perhaps through many physical links, in the underlying network. An overlay network can implement different types of protocols at the logical level, including protocols materially different from those implemented at the physical level. The concept of overlay networks is often viewed to include many different systems such as P2P, dial-up modems over the telephone network, or even some types of Content Delivery Networks (CDNs). Usually, the usage of overlay networks may come with a price, for example, in added latency that is incurred due to longer paths created by overlay routing, and by the need to process the messages in the application level by every overlay node on the path. A particular class of overlay networks are herein referred to as Message-Oriented Overlay Networks (MOON). MOON is a specific type of overlay network that maintains control and management over the overlay nodes based on communicated messages. One exemplary Message-Oriented Overlay Network is implemented as the Spines system (www.spines.org), which is available as open source, including messaging services similar to those provided at the Internet level such as reliable and unreliable unicast, but with lower latency. In "*Resilient Overlay Networks*", David G. Andersen, Hari Balakrishnan, M. Frans Kaashoek and Robert Morris in Proceedings of the ACM SOSP, 2001, describe another example of Message Oriented Overlay Network called the Resilient Overlay Network (RON) technology (also available at http://nms.csail.mit.edu/ron/).

Reliable point-to-point communication is one of the main utilizations of the Internet, where over the last few decades TCP has served as the dominant protocol. In "*Reliable Communication in Overlay Networks*", Yair Amir and Claudiu Danilov, in the Proceedings of the IEEE International Conference on Dependable Systems and Networks (DSN03), San Francisco, June 2003, which is hereby incorporated by reference in its entirety, (Yair Amir, a co-author of the paper and co-inventor of the instant application), describe a MOON that uses hop-by-hop reliability to reduce overlay routing overhead and achieves better performance than standard end-to-end TCP connections deployed on the same overlay network. In "*An Overlay Architecture for High Quality VoIP Streams*", Yair Amir, Claudiu Danilov, Stuart Goose, David Hedqvist, Andreas Terzis, in the IEEE Transactions on Multimedia, 8(6), pages 1250-1262, December 2006, (referred to as [ADGHT06]) which is hereby incorporated by reference in its entirety, algorithms and protocols are disclosed that implement localized packet loss recovery and rapid rerouting in the event of network failures in order to improve performance in VoIP applications that use UDP to transfer data.

Application-layer multicast (ALM), referred in this document also as overlay multicast, has been implemented in overlay networks to provide multicast at the application layer. The principle of ALM is to route and forward multicast data using software running in host nodes (in terms of the underlying network). The multicast data are tunneled through the underlying Internet using unicast transmission, and the participating host nodes replicate and forward these multicast data to other host nodes in the overlay network until the messages reach the destined receiver nodes.

A known ALM protocol is the NICE protocol proposed by Banerjee et al. in "Scalable application layer multicast," in: Proceedings of ACM SIGCOMM, August 2002. NICE is a tree-based ALM protocol where peers are arranged hierarchically such that every peer receives data from its parent or siblings and forwards the data to its children and siblings. This protocol has been shown to work well in many applications and networks due to its proximity-aware feature and its capability to dynamically adapt the overlay network topology to the changing network conditions. In a publication titled "Parallel overlays for high data-rate multicast data transfer" which became publicly available on line on May 2006, and later published in Computer Networks: The International Journal of Computer and Telecommunications Networking, Vol 51, issue 1, pages 31-42, K. K. To and Jack Y. B. Lee of Department of Information Engineering, of the Chinese University of Hong Kong, disclosed extending the NICE protocol to use multiple parallel overlays in the same ALM session to spread the data traffic across more available network links in video content distribution applications.

Known systems extend the boundaries of IP multicast via overlay networks that connect IP multicast "islands." One example of performing multicast communication in computer networks by using overlay routing is disclosed in U.S. Pat. No. 7,133,928 issued to McCanne. Two publications entitled "Universal IP Multicast Delivery" are published by Zhang et al. One publication is in Computer Networks, special issue of on Overlay Distribution Structures and Their Applications, April 2006 and the other is in Fourth International Workshop on Networked Group Communication (NGC), October 2002. In a Technical Report dated April 2000, Paul Francis discloses "Yoid: Extending the Internet Multicast Architecture."

In such systems, remote users participate in the IP multicast through a unicast tunnel when an existing IP multicast network does not reach all of the locations who wanted to be part of the multicast, for example because of network hardware limitations, restricted cross-Autonomous System IP Multicast, or other reasons. In some cases, the overlay network using unicast connects multiple "islands" of IP multicast connectivity so that all of the users would connect through IP multicast and may not even be aware that they were actually connected by an overlay network. The architecture of bridging IP multicast islands through a unicast overlay seeks to extend the boundaries of IP multicast as it currently exists without any mapping of the overlay group identifier to the IP multicast group identifier, as the address in the overlay was the same as the IP multicast address even if it is tunneled over an IP unicast address.

There remains a significant need in the art to provide a managed but widely distributed network capable of transporting and delivering any group of high quality live flows such that each flow has potentially different source and different destination set, at a truly global scale, thus allowing content providers to maintain control over the distribution of their live content. Further, this content needs to be delivered with minimal latency, consistently high quality, with high reliability, and at an attractive cost. With the advances in power of processing units, there exists a commensurate need for a system, method or protocol for scaling reliable real-time or near real time delivery of large amounts of data, such as Standard Definition (SD) and High Definition (HD) video data, as well as interactivity, for example, in video or online gaming, applications. What is needed is a network that supports any-to-any high quality live flows at global scale delivered with high reliability at attractive economics.

SUMMARY

Briefly, various aspects of the system and method disclosed herein support a system and method for routing flows via multicast flow transport for groups and for delivery and transport of flows to destination nodes via overlay networks. Overlay nodes executing overlay processes create and maintain the overlay networks. A plurality of sites are connected to each other via the parallel overlay networks with each site comprising one or more transit routers that route the flows to the destination nodes.

DETAILED DESCRIPTION OF THE INVENTION

Figure 1:
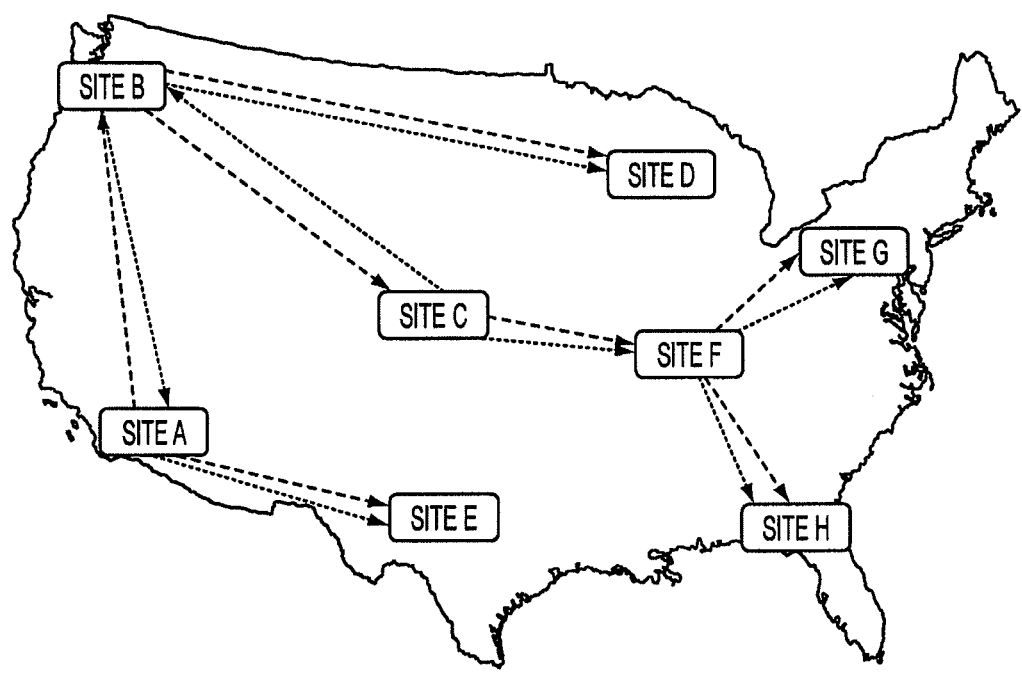
FIG. 1 shows locations of a number of sites with flows having the same receiving sites.

The present invention is implemented with application-level overlay networks comprising a plurality of parallel overlay networks that are applied over an underlying network of nodes, for example an IP network, such as the Internet. The present invention is described herein according to the following definitions:

DEFINITIONS

A process is an algorithm or method executed in a processing unit.

A state information is any information that a processes receives for performing a task or produces by performing a task.

A global state information is any state information that is shared with processes in more than one site.

A real time process is a process that is executed to complete tasks before a specified deadline.

A processing unit is the basic unit of computation provided by a CPU that can execute independent IO and computation tasks. For example, in a multi-core CPU it would be a core, in a single-core CPU it would be the CPU itself. Hardware threading, such as Intel Nehalem HyperThreads or Sun SPARC T2 hardware threads can be processing units.

A node comprises one or more processing units running processes that perform I/O functions for sending and/or receiving flows.

A flow is a series of related packets communicated amongst a sender node and one or more receiver node(s).

A live flow is a flow that reaches each receiver node within a defined delay budget.

A receiver node is a node that executes a process for receiving flows.

A sender node is a node that executes a process for sending flows.

A site comprises a location for a group of nodes that communicate with each other over an intra-site network, such as a local area network, and have access to an inter-site network, such as the Internet. In one embodiment, nodes are located at geographically dispersed sites.

An overlay node is a logical node that executes an overlay process.

An overlay process is a process that creates and maintains an overlay network and the flows within it according to an overlay protocol.

A shadow overlay process is a type of overlay process used to provide hot backup for a corresponding overlay process. The shadow overlay process executes the overlay protocol as if it were the corresponding overlay process when that overlay process fails.

A protocol is a set of conventions governing the treatment or the formatting of data in an electronic communications system, including a target delay time D within which packet deliveries are attempted.

An overlay protocol is a protocol for controlling flows between at least two overlay processes based on a defined policy that relates to connectivity, routing of flows and/or communicating messages in an overlay network. The overlay protocols in different overlay networks can be based on the same or different policies.

A logical link comprises a path formed along multiple physical links connecting the nodes of the underlying network.

An overlay network is a network of overlay processes executing on overlay nodes connected to each other by logical (or virtual) links in a computer network that is built on top of an underlying network of nodes.

A multicast network is a network that uses a multicast protocol that copies a flow from a sender node to a plurality of receiver nodes only in those interim nodes where a logical link to at least two receiver nodes splits.

An overlay multicast network is an overlay network that uses less than or equal network bandwidth to deliver the flows from a sender node to a plurality of receiver nodes than would be required if using only a unicast protocol between the source and each of the receiver nodes.

A message is any information that is communicated with a node. A message can be part of a flow or independent from it, such as a control message that is not part of a flow.

A Message Oriented Overlay Network (MOON) is a specific type of overlay network having overlay nodes that execute a MOON process. A MOON maintains control and management over the overlay nodes based on communicated messages. A MOON does not use persistent storage to store data messages during transit.

A MOON process is an overlay process that controls or otherwise manipulates messages passing through the overlay network to improve message service characteristics such as reliability, latency, jitter, recovery protocols, reordering, timing or other network properties, or to add new network capabilities or services. A MOON process stores messages during transit in system memory.

A transit router (TR) is a node that executes one or more overlay processes that create and maintain one or more overlay networks. One example of a TR is a server class computer that has one or more processing units. Another example is a dedicated routing device that runs software programs.

An access node (AN) is a node that executes AN processes using one or more processing units to receive flows and send flows to overlay nodes as well as delivering those flows to receiver nodes and ingesting those flows from sender nodes, which establish connections to the AN. One example of an AN is a server class computer.

A super node (SN) is a logical node made up of one or more transit routers in a single site that acts as an overlay node participant on parallel overlay networks.

Parallel overlay networks are a plurality of overlay networks such that each two overlay networks share the majority of sites they run on.

An operating system (OS) is a computer program executed in one or more processing units that is responsible for the management and coordination of activities and the sharing of resources. OS instances can be executed in different hardware, in different Virtual Machines, or both.

A group communication service (GCS) is a message service that provides Virtual Synchrony semantics, as disclosed by K. Birman and T. Joseph in "*Exploiting Virtual Synchrony in Distributed Systems*", in Proceedings of the ACM Symposium on Operating Systems Principles, pages 123-138, November 1987, or one of its derivatives, such as Extended Virtual Synchrony, by L. E. Moser, Y. Amir, P. M. Melliar-Smith and D. A. Agrawal, "Extended Virtual Synchrony", in Proceedings of the IEEE International Conference on Distributed Computing Systems, pages 56-65, June 1994.

Access Overlay Router is a node that executes a process that bridge flows on an overlay network with flows on an IP network. The Access Overlay Router may have multiple network interfaces and may communicate on multiple IP networks as well as zero or more overlay networks.

An overlay group is a group of receiver nodes within an overlay network.

An overlay group identifier identifies an overlay group.

Native multicast service is a multicast service provided by a network to a multicast group, such as IP multicast service native to an IP network such as the Internet.

A native multicast group is a group of receiver nodes that request to receive data sent to a native multicast group identifier that identifies a multicast group within the network.

System Overview

The system and method of the present invention reliably delivers large numbers of live or non-live flows (or streams) from any source node to multiple receiver (or destination) nodes via a relatively small number of sites at locations in a large geographic area. In contrast to prior art methods mentioned above, the present invention takes an overlay network which provides more services than IP multicast (and different ones as well) and improves it's scalability in networks where IP multicast is available.

FIG. 1 shows the locations of a number of sites on the map of the United States. The sites can be located over areas in any continent, country, state or region. In one embodiment, the sites are located in geographically distinct locations selected according to budget delays. For live flows, such budgeted delay can be about 100 ms. Each site has one or more connections to a public network such as the Internet, through connectivity provided by network service providers. One embodiment of the invention is implemented in two or more (e.g., three sites) ingress and egress sites for ingest, transport, and delivery of flows.

In one example deployment, each site is situated so that its direct neighbors on the overlay network are about 10 ms away. For example, a deployment with good connectivity with about 15 to 20 sites should provide good enough coverage that allows delivering flows with reliability acceptable to live TV service, with end to end delay of about 100 ms from anywhere to anywhere in the continental US. A world-wide network, while needing a slightly higher latency budget can be covered using the same method by about 50-100 sites.

Each flow is identifiable and can be a point-to-point flow (e.g., from a source node to a destination node), a point-to-multi-point flow (e.g., a multicast flow from a source node to multiple destination nodes), or a multipoint-to-multipoint flow (e.g. an online game). In one embodiment, the present invention is a managed overlay network architecture that supports the transport and delivery of a large number of live flows from any source to any destination over any network, such as an IP network, on a global scale. The architecture allows a content provider to deliver live flows uniquely to a large number of receiver nodes only when a receiver node specifically requests it.

The framework upon which the parallel overlay networks are built includes intelligence for managing flows (live or non-live) with a large aggregate amount of throughput over a distributed architecture comprising a relatively small number of sites, each of which with one or more transit routers. The framework also maintains high quality and original fidelity of live flows while maintaining low end-to-end latency under a variety of underlying network conditions. Further, the framework allows for high reliability of the live flows through intelligence that recovers packets (due to, for example, link flaws or failures) within a small latency budget. Error recovery protocols are implemented between transit routers with routing algorithms that consider factors such as policy information, bandwidth costs and network conditions. The flow transport in the framework is fault-tolerant.

The framework delivers various levels of control and flexibility to service providers, allowing them to economically deliver any group of flows from any group of sources to any group of destinations at a global scale with high quality and reliability. In one application, the present invention can be used to deliver requested live content by subscribers at any number of destination or client nodes using intelligence for customized hop-by-hop and end-to-end protocols on to the Internet as the underlying network.

Various embodiments and aspects of the system and method of the present invention described herein provide highly reliable, low latency network services over the wide-area Internet. An exemplary network according to the present invention is implemented in a Flow Transport and Delivery Network (FTDN) comprising parallel overly networks. The FTDN is an intelligent, content-aware, highly scalable managed network designed to deliver high quality real-time flows over the Internet such as live video, TV channel and interactive games by supporting many concurrent flows. The FTDN is scalable with the number of high capacity flows. It is also scalable with the number of source nodes and receiver nodes (client nodes) as long as these nodes connect with one of the FTDN sites (preferably a site they can reach with low latency and good connectivity).

Figure 2:
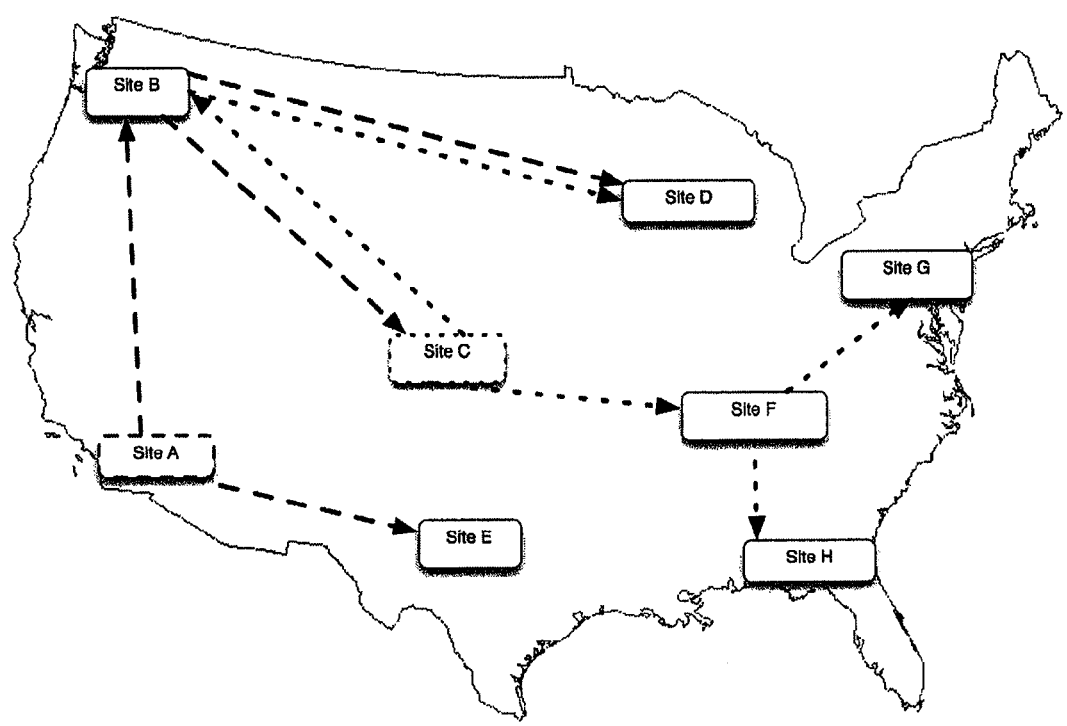
FIG. 2 shows locations of a number of sites having different set of receiving sites.

Each flow can have multiple destination nodes and each source node can have multiple flows. The FTDN could be used to provide high-quality and real-time content, such as Standard Definition (SD) and/or High Definition (HD) video, online game support and other multimedia over the Internet for viewing or distribution to millions of users or subscribers. Two examples of networks for flow delivery according to the present invention are shown in FIGS. 1 and 2 where a network of overlay sites across the USA forward two flows to either all of the sites (for example a popular flow that has viewers everywhere) or a subset of the sites for a less popular or more regionally interesting flows. FIG. 1 shows all sites receiving all the flows. FIG. 2 shows each flow having different set of receiving sites, with some sites receiving both flows. In both cases, links between sites are determined by site connectivity and do not vary with flows and the communications costs are shared symmetrically between the sites.

Network Architecture

A generic architecture for scalable, highly available, globally optimized message-oriented overlay networks according to the present invention uses several techniques for distribution of a large number of live or non-live flows. Such flows can be high bandwidth flows, e.g. for SD and HD video streams, preferably via optimal multicast routing that could be fully reliable or "almost" reliable in recovery of end-to-end errors. The FTDN supports reliable real-time multicast distribution for interactive online games and scales to thousands of flows and millions of subscribers who can view live video flows.

In one embodiment, the architecture scales overlay network technologies so that they can handle a large number of unicast and multicast flows. The large scale is achieved through the utilization of multiple computers that implement each super node in parallel overlay networks as well as the utilization of the modern multi-core processor architecture in these computers, as further described below.

Figure 3:
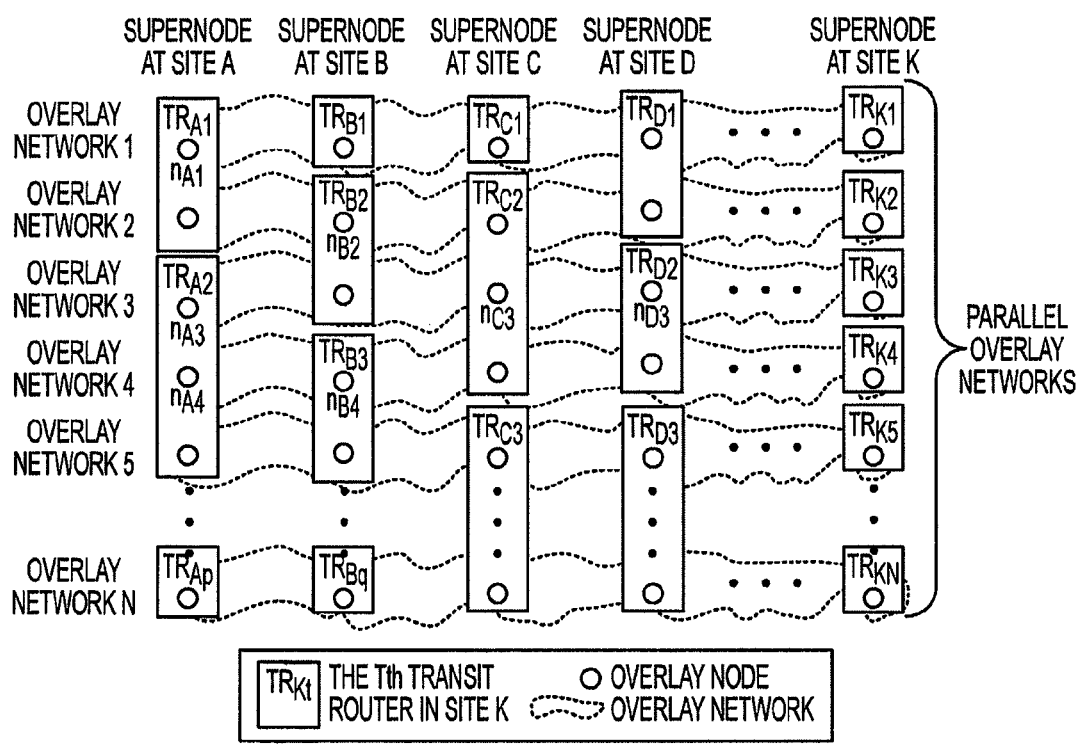
FIG. 3 shows a network architecture diagram of an FTDN according to one embodiment of the invention.

FIG. 3 shows a network architecture diagram of the FTDN that supports parallel overlay networks, shown as rows $ON_1$-$ON_N$, across a plurality of sites, shown as columns A, B, . . . , to K. The FTDN of FIG. 3 comprises a plurality of overlay nodes, $n_{A1}$-$n_{KN}$, at the intersection of each overlay network at each site. In one embodiment of the invention, overlay nodes $n_{A1}$-$n_{KN}$ execute corresponding overlay processes $P_{A1}$-$P_{KN}$ for scalable delivery of multiple flows, via the parallel overlay networks.

As further described below, the plurality of overlay processes can share network resources based on an a-priori known information without communicating with each other. The plurality of overlay processes can also be assigned to resources based on gathered information about link status, resource utilization or a parallel overlay networks' activity.

In one embodiment, the overlay processes are assigned in each node based on shared state information, as further described below. For example, state information associated with a plurality (at least two) of identified flows can be shared between the overlay processes executed in overlay nodes of parallel overlay networks. Such sharing of state information allows for coordination of overlay processes for scalable delivery of multiple flows in parallel overlay networks.

Each overlay network may have different or similar connectivity characteristics with other overlay networks, thus yielding different or similar routing decisions based on defined routing policies. For example, using different routing policies for different overlays with similar sites creates a relatively simple way to provide multi-path routing for fault tolerance and high network throughput purposes. Using similar routing policies for different overlays with similar sites is a relatively simple way to allow high processing costs per message while maintaining high throughput, as further describe below.

Any kind or number of parallel overlay networks, e.g., message oriented or non-message oriented, can be implemented over an underlying network. The parallel overlay networks can be the same or different overlay networks. An exemplary scalable message-oriented overlay network comprises a plurality of MOONs that execute MOON processes. Examples of specific overlay networks that could be used as the MOONs in the FTDN are Spines and RON mentioned above. The underlying network can be any type of public or private network, and can be an IP network or the Internet.

A super node contains one or more transit routers located at a site. A super node acts as an overlay node participant in different overlay networks of the parallel overlay networks. A transit router executes one or more overlay processes that create and maintain one or more overlay networks. As shown in FIG. 3, Site A has p transit routers, such that $TR_{A1}$ contains two overlay nodes, $TR_{A2}$ contains three overlay nodes, etc. Overall, there are N overlay nodes in Site A. On the other hand, Site C has 3 transit routers, namely, $TR_{C1}$, which comprises one overlay node, $TR_{C2}$, which comprises three overlay nodes, and $TR_{C3}$, which comprises the remaining overlay nodes for a total of N overlay nodes in the site. Site K has N transit routers, each of which comprises one overlay node.

Figure 4:
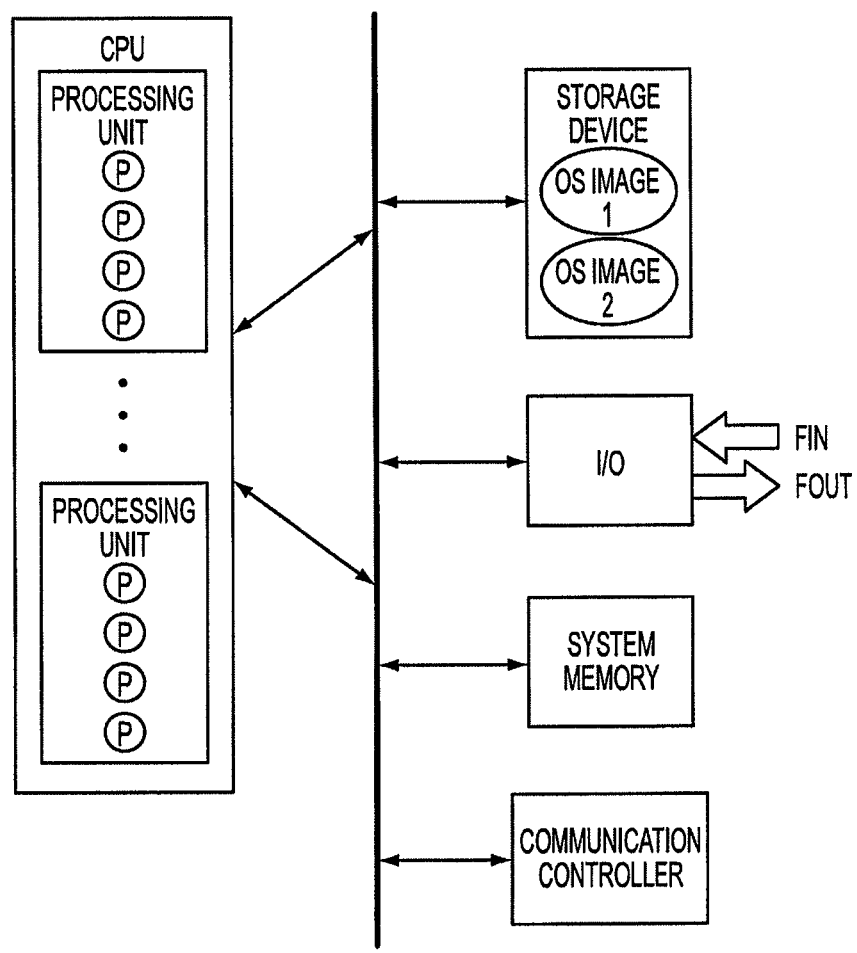
FIG. 4 shows a block diagram of a transit router.

FIG. 4 shows a block diagram of a transit router. The transit router comprises at least one CPU supporting one or more processing units, each executing one or more overlay processes P. The transit router can be implemented by a single core processing unit, a multi-core processing unit or otherwise by a single computer or multiple computers having one or more processing units for executing overlay processes. In one embodiment, the transit router has a volatile system memory and an I/O interface for receiving flows from other transit routers or access nodes, or transmitting flows to other transit router or access nodes and interfacing with other networks. In another embodiment the transit router also has a persistent storage device.

In order to support interactive and real-time flows, the end-to-end delay and jitter should be minimized. In one embodiment, the transit router forwards flows from an input port to the output port of the I/O interface through the system memory, without storing any part of the flow onto the persistent storage. The transit router may store the flow, or allow another host collocated with it to store the flow, in order to support interactive services such as replay, video capture and clip transmission, or selective frame capture in multimedia applications. It may also require stable storage to support logging for security, audit, or monitoring purposes.

In one example, the transit router operates under the control of a single operating system, e.g., Linux. Alternatively, a number of operating systems, the same or different, e.g., Windows and Linux, or three Linux instances, execute within the transit router as virtual machines, some or all of which executing overlay processes. A communication controller passes various information amongst the overlay processes. One or more overlay processes are allocated to each transit router. Each overlay node is managed by its own process (daemon), thereby allow efficient utilization of multi-core, multi-processor modern computer architectures. This increases the throughput potential of the super node overall collection of overlay processes while allowing for relatively high average computation expense per message flowing through each overlay network without incurring harmful delay. The ability to expend relatively high computation expense per message going through the parallel overlay networks on every hop, enables the optimization of network performance for high throughput, high reliability and low latency. Examples include hop-by-hop recovery, coding, etc.

This architecture is in contrast to the common practice of using a large number of threads within the same process in order to utilize multi-core processor architecture. Executing separate overlay processes in the one or more transit routers provides strong separation, protection against side effects between the different overlays, and improves fault independence. Such a programming approach is also much simpler than a large-scale multi-threaded approach and fits both the multi-core hardware and the intrinsic nature of the problem with a large number of different separate flows. The architecture of the present invention also supports the use of virtualization to utilize multi-core processors by instantiating several virtual machines on each physical machine, such that the overlay nodes running on a physical machine can be divided between the virtual nodes.

Some client nodes can run under the control of senders of flows e.g., content providers, and others under the control of receivers of flows, e.g., subscribers. The membership of each flow can be dynamically updated as the set of sites that need to receive each flow changes. Upon such a change, the optimal dissemination graph is recalculated dynamically on the fly. In one embodiment, the FTDN manages layer 5 to layer 7 of application level traffic flows. The FTDN is aware of all of the flows and the network by keeping and managing the state of every flow in a closely monitored manner. FTDN is also aware of the underlying network conditions allowing it to route around problematic links. Flows from any source can be delivered to any subset receivers, enabling segmented service. FTDN maintains end-to-end control over the flow and supports policy, cost and utilization based flow admission control.

In one embodiment, in contrast to providing a "fair" service, the FTDN provides service within its current capacity in terms of available bandwidth and processing power, and flow priorities. When resources are too scarce to meet high quality requirements of all flows flowing over the parallel overlay networks, admission control limits low priority flows that require scarce resources. For example, this is accomplished by maintaining and sharing information regarding the required throughput for each flow and its overlay site membership, the processing capacity of each overlay and the available overlays, and the currently available bandwidth capacity in each site.

State Management

All of the transit routers share knowledge of the state of flows through the entire overlay network. In one embodiment, each super node sends state update packets to each of its neighboring super nodes to inform them of changes to its local connectivity, changes to any local link costs, and a list of which flows this site has local receivers for. The transit routers within a site share additional state information with each other through a local network. This state information includes which transit routers are responsible for handling each overlay network.

According to one embodiment of the invention, a communication controller shares state information amongst a plurality of the overlay processes. The communication controller can comprise one or more communications processes executed by transit routers. The communication controller can share the state information by providing access to state information that is shared between the overlay processes.

As described later, a coordinator process makes certain determinations regarding coordination of the multiple flows locally in the transit router based on global state information. Such determination can relates to admission of a flow to an overlay network, allocating an overlay network to an overlay process or allocating an overlay process to a node. The admission of a flow to an overlay network can also be based on a priority information.

Figure 5:
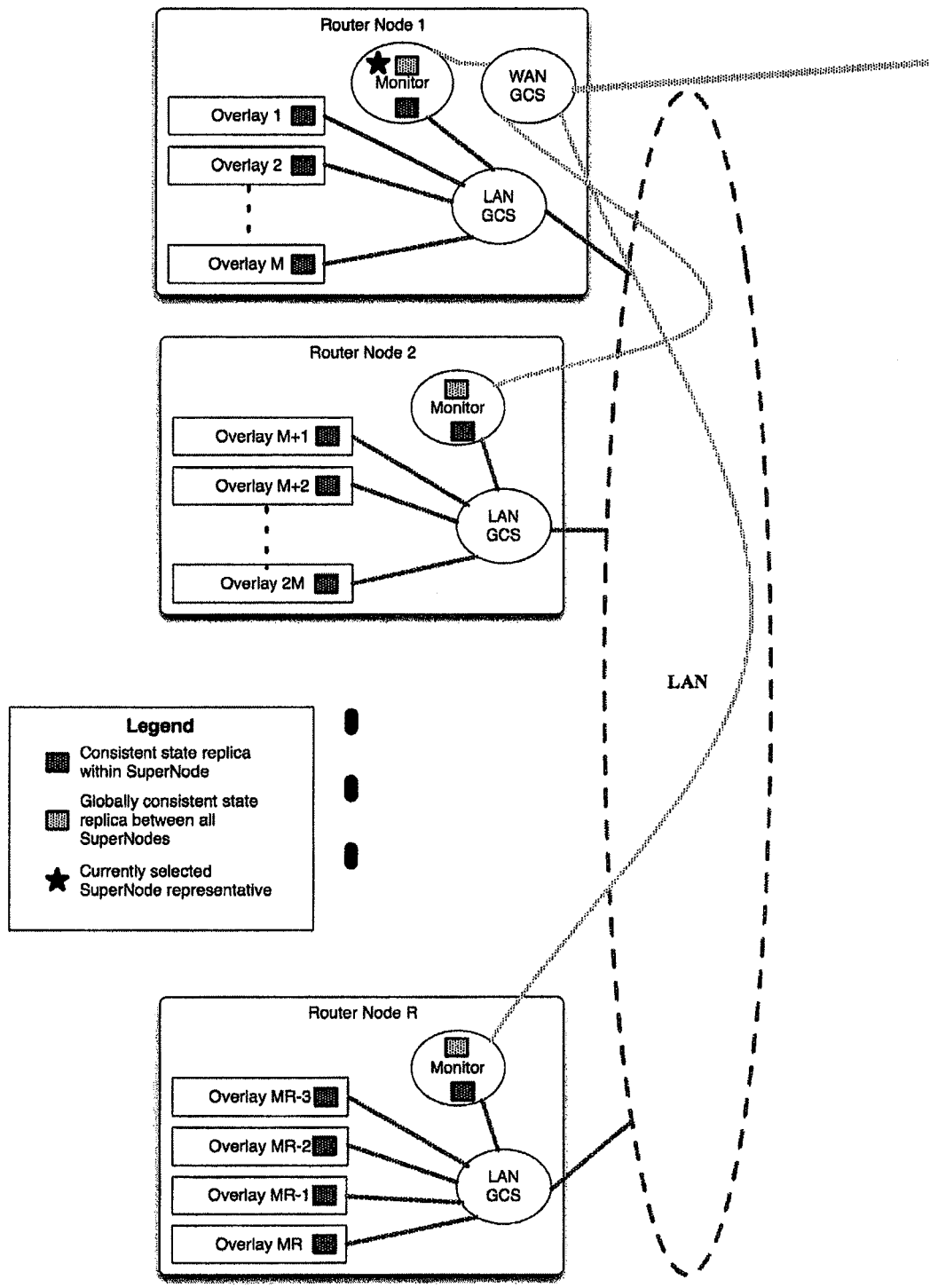
FIG. 5 shows the block diagram of a super node.

As stated above, in one embodiment, the shared state information can be associated with a plurality of identified flows. In another embodiment, the transit router node replicates state information of one overlay process that maintains an overlay network by pushing the information to be shared by at least one other overlay network process that maintains another overlay network. In still another embodiment of the invention, a group communication controller replicates state information amongst these overlay processes. The group communication system can receive global state information from an overlay process running in another transit router associated with the parallel overlay networks. Multiple overlay nodes can share the same instance of the group communication service. For example, there can be a single group communication instance (e.g. a Spread daemon) for each transit router, a single instance for the whole super node, or even (in principle) a single instance for the whole parallel overlay networks. A group communication service instance can coordinate replication of state information in multiple super nodes. Alternatively, each super node may have multiple group communication participants in a global group communication service instance. FIG. 5 presents an example in which each super node has a single group communication service instance, with each transit router as a participant (LAN-GCS), and another, global, group communication service instance between the sites, with a representative transit router from each site as a participant. In this example, if the representative fails, another representative from the local site takes its place. This is simple to implement based on the virtual synchrony semantics and failure notification of group communication services (e.g. Spread).

In yet another embodiment, state information can be shared over operating system boundaries of one or more transit routers. According to this embodiment, the FTDN has one or more processing units that run a first overlay process under the control of a first operating system to perform a function in a first overlay network. A second overlay process under the control of a second operating system performs a function in a second overlay network. The first overlay network and second overlay network comprise a parallel overlay networks with a plurality of overlay nodes. Under this arrangement, the communication controller provides access to state information that is shared between the first overlay network process that maintains a first overlay network and the second overlay network process that maintains a second overlay network. The first operating system can be different from the second operating system. One overlay node can be executed per overlay process in each of the operating systems. One overlay node can also be executed per overlay process in a Virtual Machine.

FIG. 5 shows the block diagram of a super node. A super node contains a collection of physical nodes (e.g., computers or other processing units), each with a number of CPUs, each CPU with a number of cores, and potentially, each core with a number of hardware threads, for example, those defined by Sun Microsystems. Exemplary router nodes may be constructed of standard server class computers with a CPU, memory, and network interfaces. In one exemplary embodiment of the invention, the routers may also be dedicated routing devices running software programs.

The super nodes are connected by a network. Each super node has one or more transit routers, shown in FIG. 5 as Router Nodes 1-R. Each transit router comprises one or more overly nodes, (for example, shown as Overlay 1-M in Overlay Node 1), formed by executing overlay processes. Each of the overlay processes is dynamically allocated to a single transit routers at any time for routing unicast and/or multicast data messages to receiver nodes over parallel overlay networks, preferably, with various levels of reliability for delivering such messages, as described further below. Each transit router executes overlay processes with one or more processing units, such as one or more cores, to create and maintain two or more parallel overlay networks. A communication controller shares data between the transit routers within a site via an intra-site network, such as a local area network. An inter-site network, such as the Internet, connects all of the sites to the receiver nodes.

FIG. 5 also depicts sharing state information relevant to the plurality of parallel networks overlays within the super node by dark squares. State information is shared between the different overlays using a site-based group communication system while a global wide area state information (shown in light square) is maintained using a wide-area instance of the group communication system that spans other super nodes in different sites. In one embodiment, the group communication service is a communication service offered by the Spread toolkit (www.spread.org), which allows for separate configuration of communications amongst nodes. The group communication toolkit can be configured differently for each instance of the GCS, depending on the need for scalability and performance (especially latency and fault detection). Other possible setups can have a different number of nodes participating in the global, wide area group communication configuration, with varying fault tolerance and scalability properties. In the extreme, all state information can be shared globally such that there will be no separation between state local to the super node and global state.

In one embodiment, each super node consists of one or more transit routers and one or more access nodes. Each access node receives flows from, and sends flows to, each overlay network through a transit router executing a process that maintains that overlay network. An access node delivers those flows to remote destination nodes that establish connections to the access node. When a client node connects to an access node, a short handshaking protocol exchange establishes a shared state between the access node and the client node. This shared state includes what port numbers they are communicating on, flow control settings, available buffer space, choice of reliability protocol, and an identifier for the client session. The transit router and access node can be instantiated on a single machine or can be split among many machines, each separately performing the functions of a transit router, an access node, or both.

Figure 6:
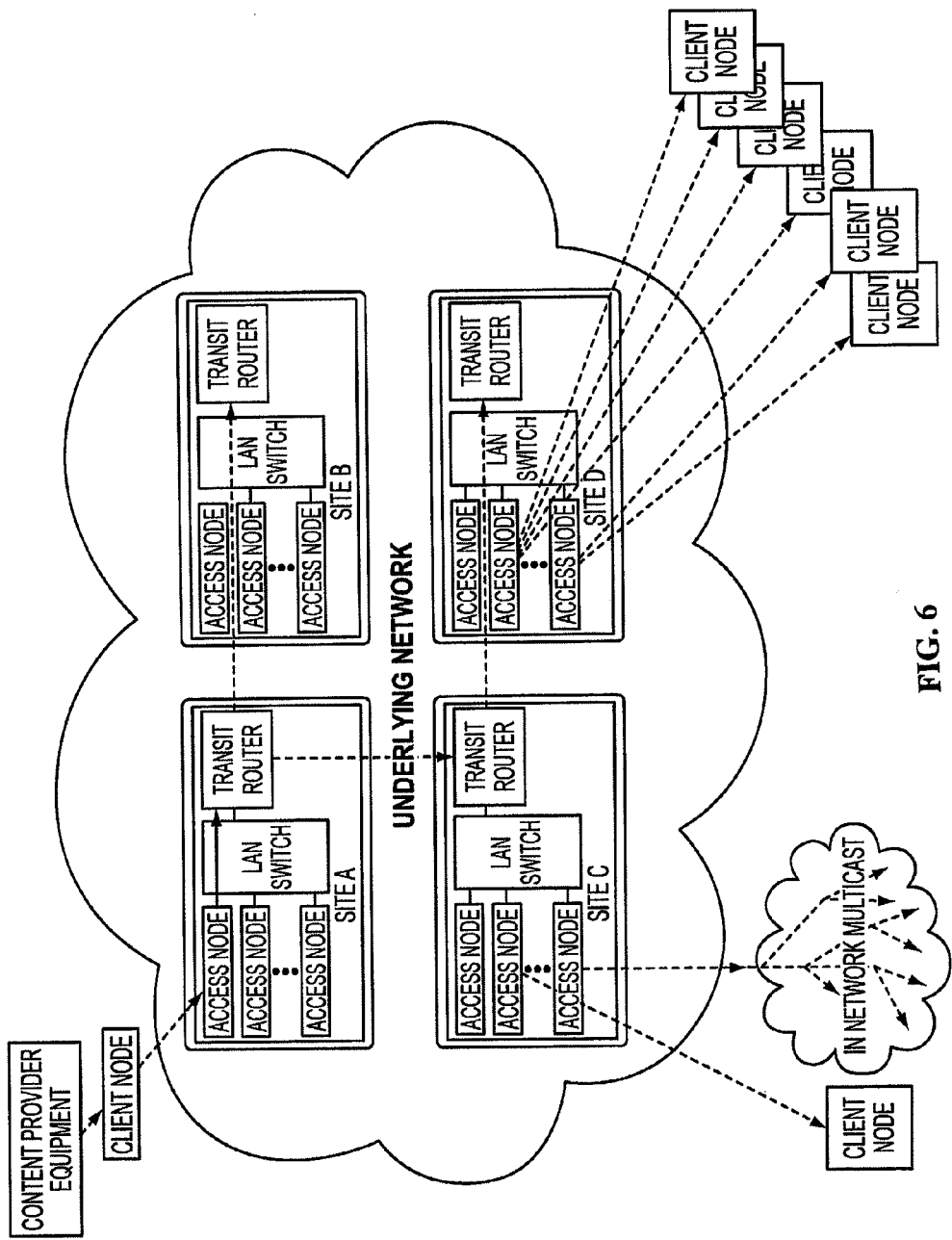
FIG. 6 shows the block diagram of plurality super nodes in corresponding sites.

FIG. 6 shows the block diagram of plurality super nodes in corresponding sites forming a backbone network for delivery of flows from one or more source nodes (content providers) to one or more receiver nodes (clients). The transit routers have coordinating software between them that keeps state of every flow and does routing, resource assignment, network monitoring and admission control. Access nodes aggregate ingestion and delivery points and connect to transit routers communicating with each other, for example, via a multicast protocol over distributed nodes interconnected with IP clouds. In one embodiment, each transit router is an overlay multicast router that manages multicast flows not as IP-Multicast groups, or SSM sender identified groups, but rather as dynamic groups. Each transit router tracks each flow as a separate multicast group and forwards that flow onto additional transit router downstream according to the sender-based multicast routing tree computed by all of the nodes. In one embodiment, each group sender has its own optimal dissemination graph. The routes computed by each transit router is either the same or will become the same within a small window of time as each transit router calculates the routes based on link-state information provided by all of the other routers. This type of full route calculation is feasible because it is only carried out by the relatively small (e.g., thousand or less, and, in one embodiment, just 100 for a global world-wide coverage) number of super nodes, and not by all of the underlying Internet routers over which the flows may pass.

In one embodiment, the transit router only forwards flows onto other transit routers that either have a local recipient of the flow (through an access node or direct client connection) or if that transit router is along the computed routing path between the current transit router and some other transit router who does have a local client node for the flow.

Figure 7:
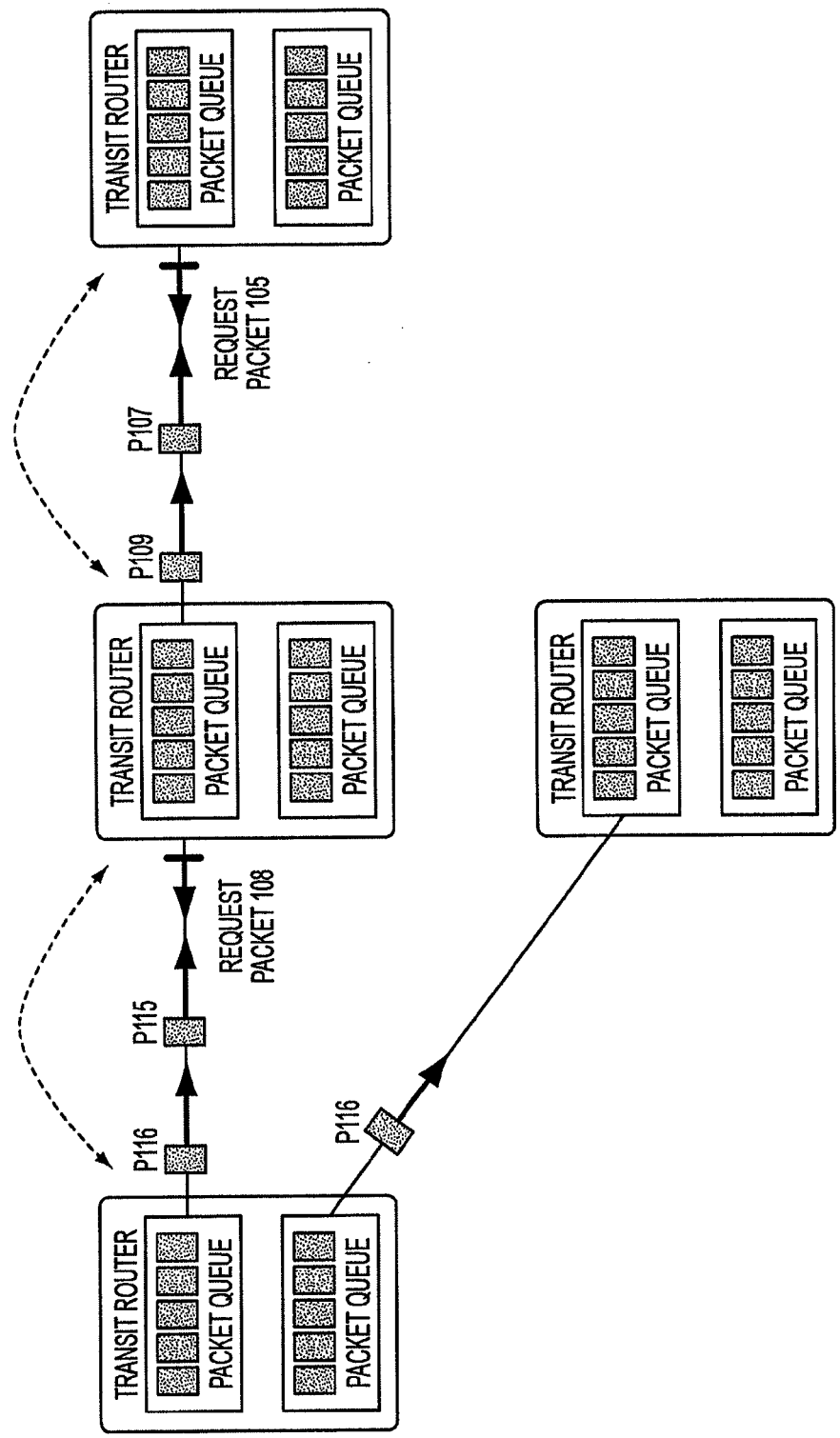
FIG. 7 shows one embodiment of a packet recovery protocol implemented in the FTDN of FIG. 3 or FIG. 6.

FIG. 7 shows one embodiment of a packet recovery protocol implemented in the FTDN. As each flow passes through multiple transit routers, each may provide local recovery of lost or out-of-order packets between itself and the transit routers one hop upstream from them. As shown, packets 108 and 105 are requested because they were lost between two transit routers. Packet 109 is forwarded on to a third transit router even though a previous packet 108 is still being recovered. This out-of-order forwarding prevents the delay caused by convoy effects and cascading losses. Several different algorithms may be used to provide different service levels. Exemplary algorithms include full reliability (even in the case of complete router failures), reliable transport unless a transit router involved in the flow fails, partial reliability where some packet loss is possible but at a much lower rate then the underlying networks' packet loss, and unreliable packet delivery where no additional efforts are made if packets are lost by the underlying network during transit between transit routers.

In one embodiment, the overlay processes uses an overlay protocol that supports recovering a lost packet associated with a flow and reordering said packet after it is recovered. Lost packet can be recovered on a hop-by-hop basis. The overlay processes can also use an overlay protocol that supports recovery of lost packets associated with multiple flows over one hop upstream from another overlay node. Alternatively, the overlay protocol can either not support any packet recovery, recovery of some lost packets or support reliable message transport.

Figure 8:
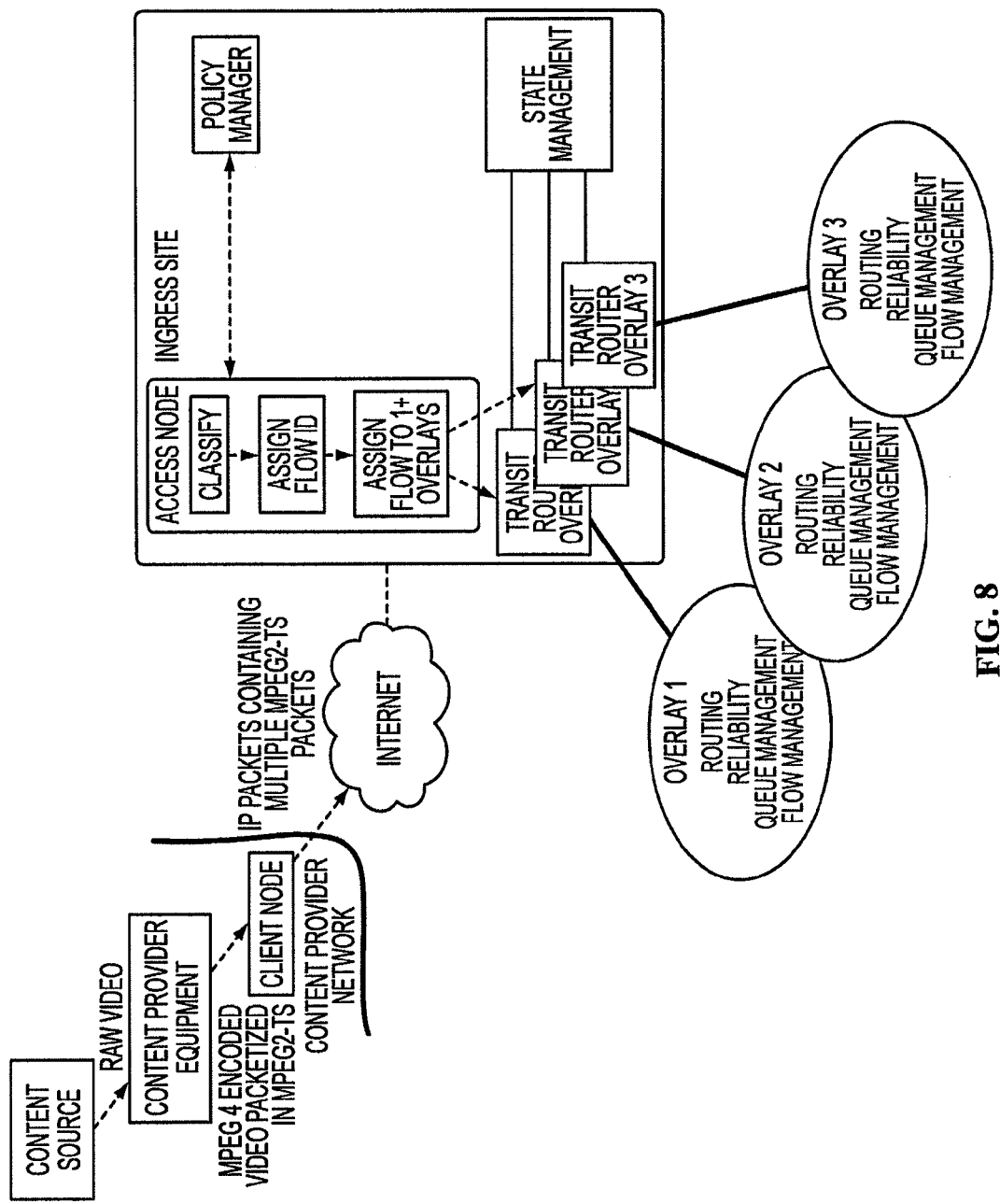
FIG. 8 shows the block diagram of one embodiment of an ingress site.

FIG. 8 shows the block diagram of one embodiment of an ingress site that receives content from a service provider. The site comprises one or more access nodes that receive one or more live flows, e.g., game or video flows, from a content source node, for example, via the Internet. The source node can be any type of a client node that is under the control of the service provider. The access nodes classify the live flows according to one or more routing polices defined by a policy management block. Once classified, the access nodes assign IDs to the live flows. Each flow ID is assigned to one of a plurality of parallel overlay networks. Each overlay network has an overlay node in one or more transit routers located in the ingress site. A state management block in the ingress site coordinates the sharing of state information within the one or more transit routers of the ingress site and those in other sites.

Figure 9:
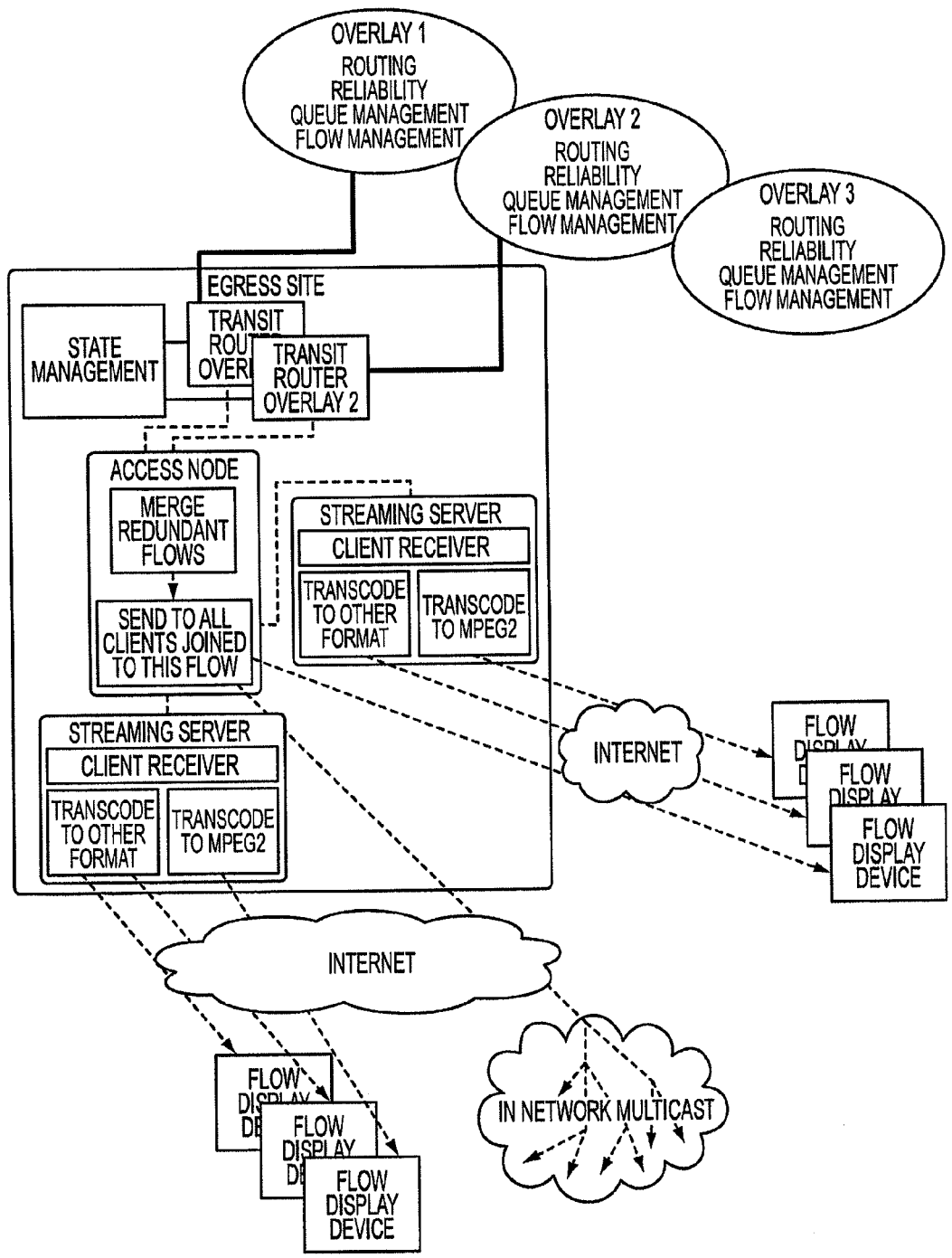
FIG. 9 shows the block diagram of an egress site.

FIG. 9 shows the block diagram of an egress site that delivers content to subscribers at destination client nodes. The live flows received over the plurality of parallel overlay networks at corresponding overlay nodes of one or more transit routers located at the egress site. Another state management block in the ingress site coordinates the sharing of state information within the one or more transit routers of the egress site and those in other sites. One or more access nodes in the egress site merge redundant flows and send them to client nodes that can join in for receiving the flows in real time. One or more streaming servers convert or transcode the content to various formats supported each receiver node.

Figure 10:
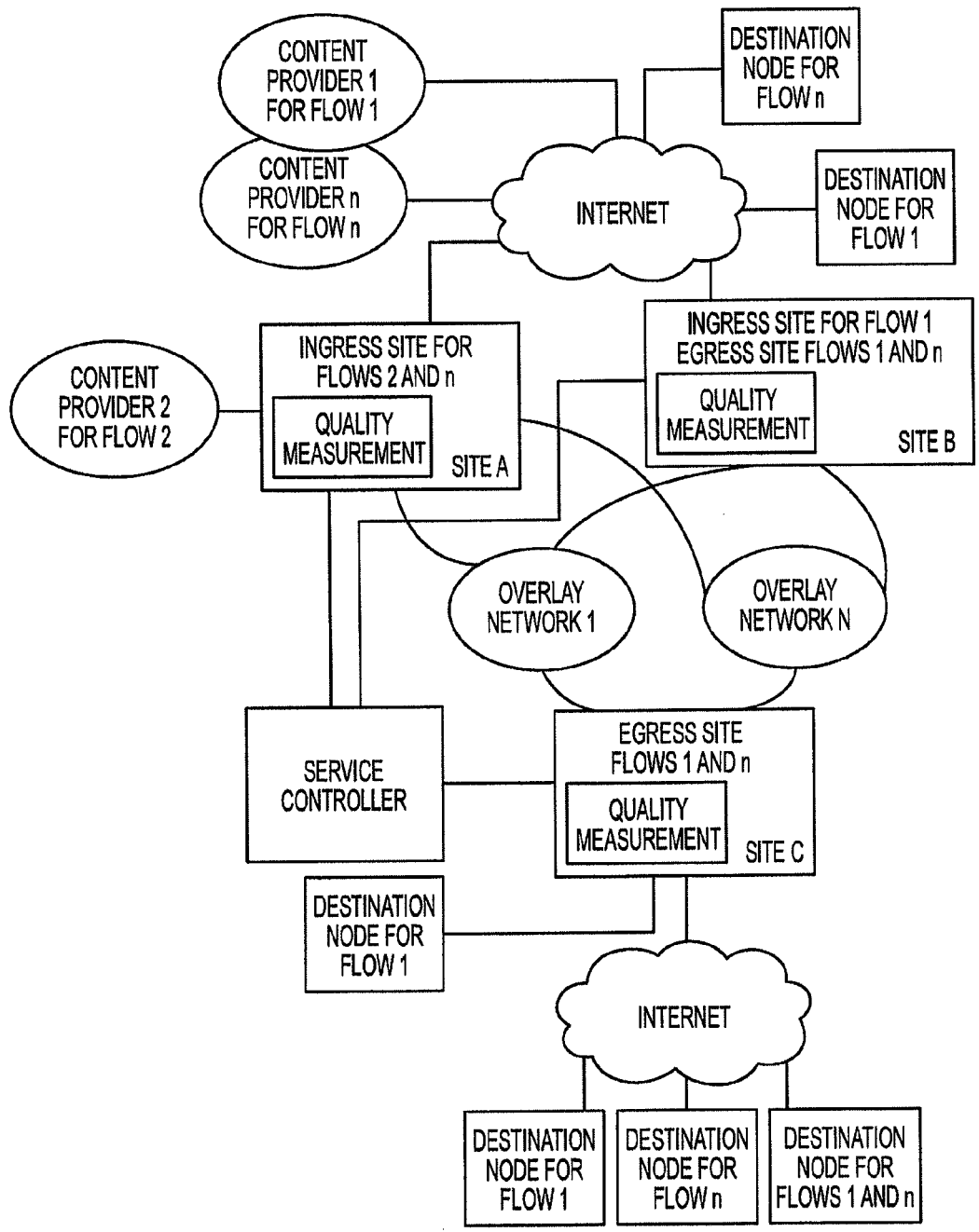
FIG. 10 shows the block diagram of an FTDN according to another embodiment of the invention.

FIG. 10 shows the block diagram of an FTDN for delivery of flows within a network that has one or more destination nodes. The flows are delivered via a plurality of sites such that each flow has a content provider connected (directly or through the Internet) with an ingress site. Each site has at least one transit router with a plurality of overlay nodes executing parallel overlay processes associated with the plurality of overlay networks. Flows are delivered to specific destination nodes through egress sites to which these destination nodes connect (directly or through the Internet). For example, Content Provider 1 with Flow 1 connects through the Internet with Site B, which therefore servers as Flow 1's ingress site. Flow 1 has sites B and C as egress sites: Flow 1 is delivered to one destination node connected with Site B through the Internet, two destination nodes connected with Site C through the Internet and one destination node connected with Site C directly. Similarly, Flow n from Content Provider n has Site A as an ingress site and sites B and C as egress sites: Flow n is delivered to one destination node connected with Site B and two destination nodes connected with Site C, all connected through the Internet. Content Provider 2 with Flow 2 connects directly with Site A, which therefore servers as Flow 2's ingress site. However, currently no destination node is interested in Flow 2 and therefore it has no egress sites and is not flowing on the parallel overlay networks out of site A. The parallel overlay networks use an inter-site network, e.g., the Internet, to deliver each flow from its ingress site to its respective egress sites and from them to one or more destination nodes.

FIG. 10 also shows a service controller that controls the delivery of specific flows to specific destination nodes based on service requests received from the destination nodes. The service requests relate to state and mapping information that is shared amongst the overlay processes, as described further below. The service controller can be distributed or centralized, and is either as part of the FTDN, outside the FTDN, or split such that a component of it is part of the FTDN.

According to one embodiment of the present invention, the transit routers and the access nodes process flows using a global multicast overlay network that can efficiently and transparently use an underlying layer, e.g., layer 2, multicast network technologies to extend the overlay multicast to a very large number of local receiver nodes and sender nodes. For example, such multicast overlay network can use multicast enabled layer 2 switches with limited group scalability to provide support for a much larger number of multicast groups without causing additional loss or delay for the receiver nodes.

Native Multicast Support

Figure 11:
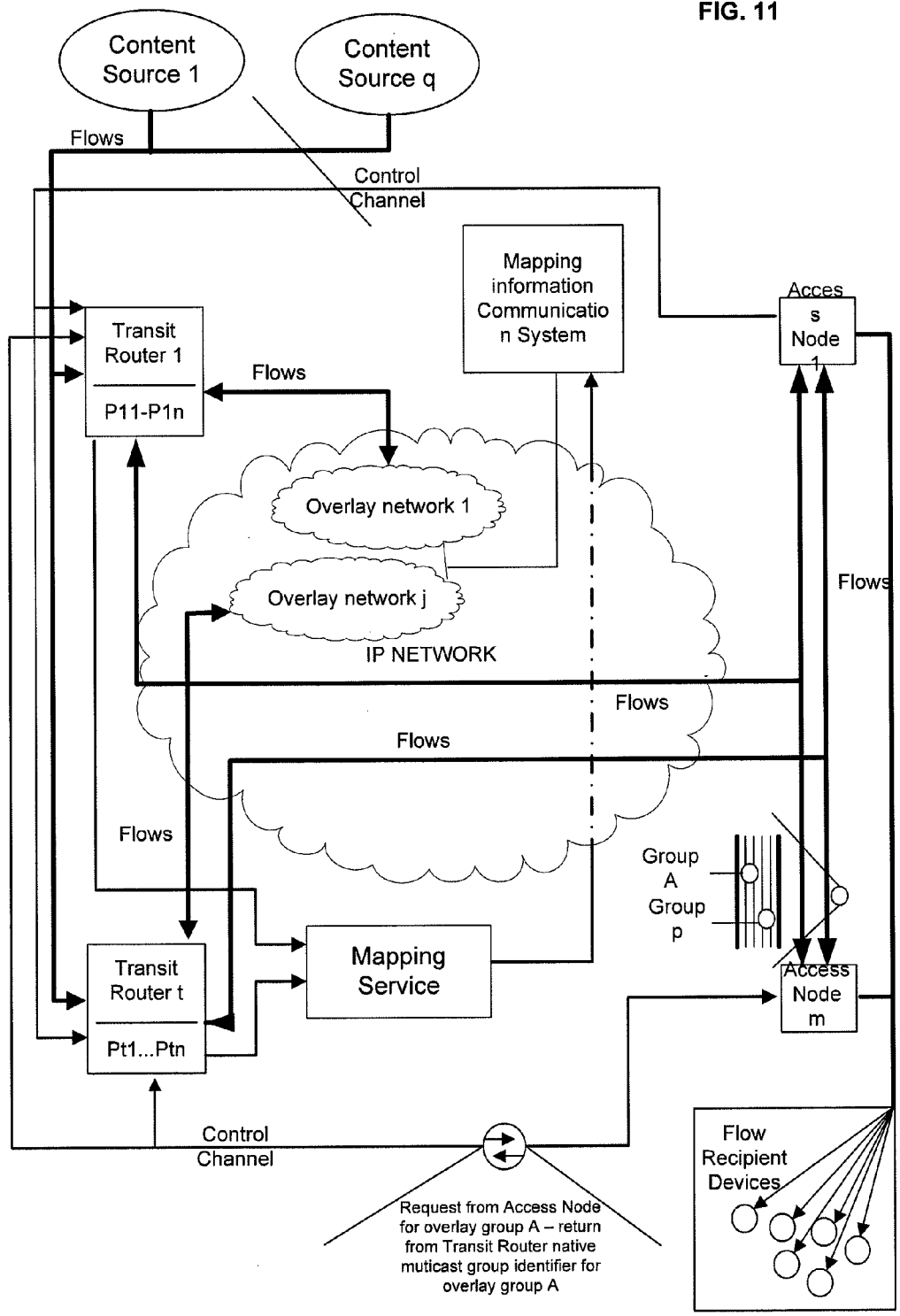
FIG. 11 shows a block diagram of system that routes flows via multicast flow transport for groups.

FIG. 11 is a block diagram of a system that routes one or more flows within a network that provides multicast flow transport for one or more groups (A-p). One or more access nodes (1-$m$) and transit routers (1-$t$) on a network that supports native multicast service, as defined above. As shown in this example, the flows are generated from content sources (1-q). The transit routers (1-t) have one or more processing units that run one or more overlay processes (P11-P1n and Pt1-Ptn) associated with parallel overlay networks (1-j) that route flows based on overlay group identifiers, as defined above. The access nodes (1-m) issue requests for one or more overlay groups, as defined above. As a result of the issued requests, the access nodes receive flows from the transit routers. The overlay processes (P11-P1n and Pt1-Ptn) utilize a mapping service that maps overlay group identifiers to native multicast group identifiers. The mapping service can be a random hash function. Alternatively, the mapping service maps an overlay group identifier to a native multicast group identifier based on the usage of overlay groups in at least some of the overlay networks of the parallel overlay networks, as further described in more detail below. A communication system that shares mapping information amongst a plurality (at least two) of overlay processes that maintain a plurality of parallel overlay networks. A control channel between the access nodes and transit routers is used to communicate access nodes requests, overlay group identifiers, and native multicast group identifiers.

As stated above, each site consists of one or more transit routers and one or more access nodes on a network, e.g. a LAN, WAN, wired or wireless. In such an exemplary embodiment, the transit router is an overlay multicast router that manages multicast flows as dynamic groups. The access node receives flows from and sends flows to the overlay network through its local transit router, and delivers these flows to remote flow recipients who establish connections to the access nodes. The roles of the transit router and access node can be instantiated on a single machine, or can be split among many machines. This method of connecting the access nodes and transit routers according to this aspect of the present invention allows a very large number of access nodes to receive flows from a few transit routers without causing congestion or network bottlenecks and while maintaining consistent state knowledge of the overlay network. This type of state would be lost if the flows were sent over a native multicast service without a method of maintaining a control connection and group coordination, as described below.

In an exemplary embodiment, each transit router manages multiple flows (and possibly multiple overlay networks), each access node serves a set of flows potentially coming from different overlays and different transit routers, and each individual flow may be served to remote clients by many different access nodes. Each flow that comes from a specific transit router is delivered to a subset of the access nodes. Access nodes may require a flow or may no longer require the flow, based on the needs of their clients. In order to function most efficiently, each access node should receive exactly the flows required by the clients connected to it at any point in time.

Figure 12:
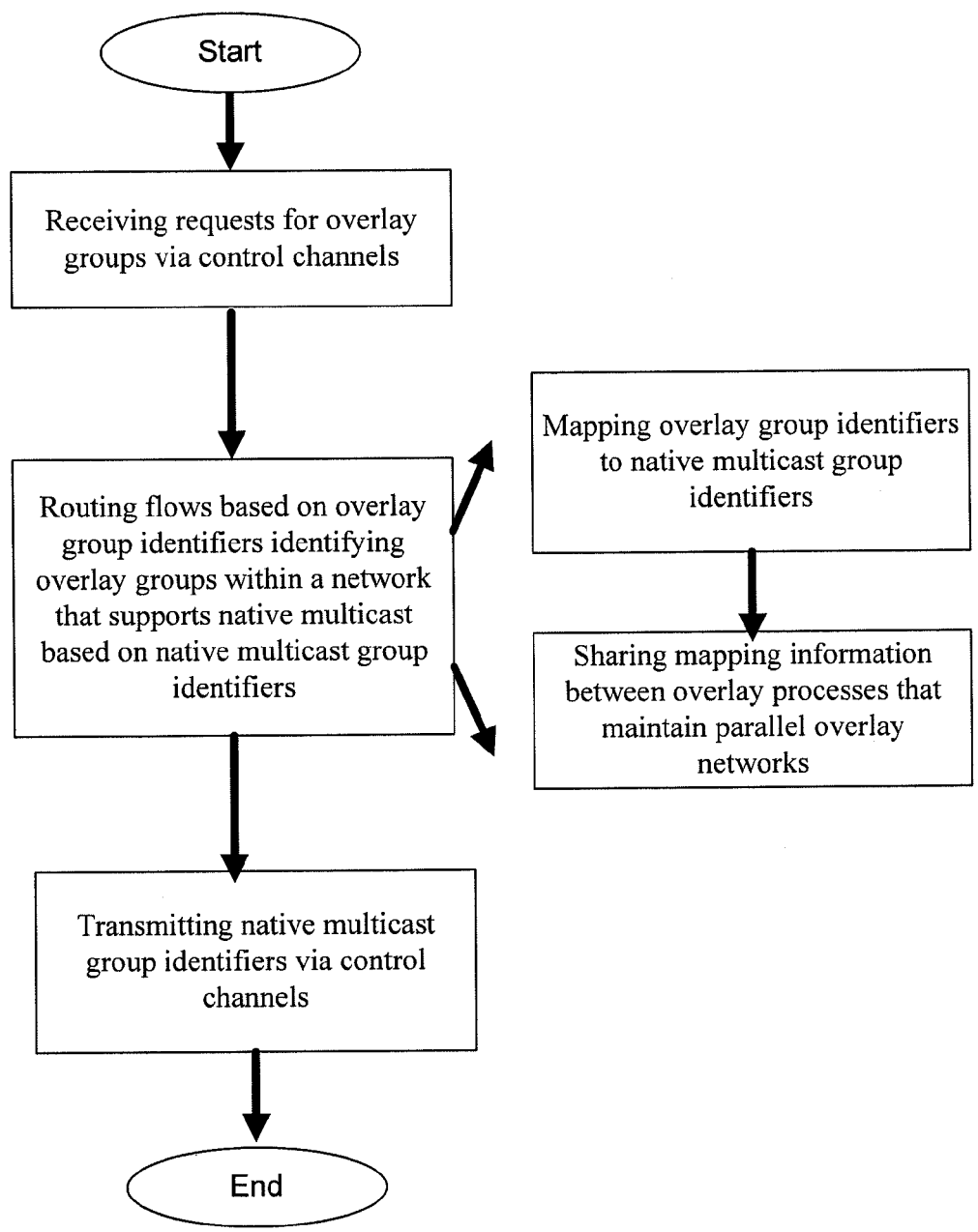
FIG. 12 shows a flow chart for a method that routes flows via multicast flow transport for groups according to one embodiment of the invention.

In an exemplary embodiment, the routing of flows between transit routers and access nodes are according to the flow chart shown in FIG. 12. More specifically, using a reliable point-to-point connection, each access node notifies the relevant transit router of its interest in the logical multicast group on the overlay, using a reliable notification (e.g., sending a join message via TCP), for example, via the control channel shown in FIG. 11. When the access node is no longer interested in the flow (e.g., has no clients interested in it), it sends a leave message. The transit router uses the information contained in the, for example, reliable join/leave messages to track the state of whether any access nodes are interested in a particular flow. This allows the global overlay network to optimize routing and dissemination of flows to only those transit routers who need them at any point in time.

The Internet Group Management Protocol (IGMP) is a communications protocol used to manage the membership of Internet Protocol multicast groups. IGMP is used by IP hosts and adjacent multicast routers to establish multicast group memberships. In an exemplary embodiment, each access node joins the IP-multicast group with the same multicast group name (as the logical multicast group) by, for example, using the standard operating system methods to request a join which results in a IGMP join message being forwarded into the directly connected network switch which forwards the IGMP join through the local area network. The IP-multicast group name could also be different from the logical group name by, for example, applying a fixed, one-to-one function FixedMap( ) of the logical group name to generate a corresponding IP-multicast group name. For example, in one embodiment, the mapping service shown in FIG. 11 uses a static map such that no two overlay group identifiers are mapped to the same native multicast group identifiers.

When a transit router needs to deliver a data message on a overlay group, the transit router converts the message into an IP-multicast datagram with the IP destination set to the logical multicast group address (or the group resulting from the FixedMap( ) function) and sends it once into a directly connected LAN switch. The switch then forwards the IP-multicast datagram to all access nodes that joined that logical multicast group. As noted above, this requires a one-to-one mapping between the overlay multicast group and a native IP-multicast group (and thus the corresponding Ethernet multicast group-address). As depicted in an exemplary embodiment, in FIGS. 5 and 11, a LAN with one or more switches connects all the transit routers and the access nodes within a site. If a switch supports a sufficient number of concurrent IP-multicast groups, for example the number of concurrent overlay groups served by that site (e.g., the number of different video streams), then the forwarding will be maximally efficient as each access node will directly receive only those flows that are required by it to forward onto remote flow recipients.

However, many switches only support a small number of IP-multicast groups when forwarding (often less then a few hundred in practice) and the number of flows supported by an exemplar Scalable Message-Oriented Overlay Network can be tens of thousands, so this method also includes a variation that enables use of switches which support only a lesser number of IP-multicast groups.

Figure 13:
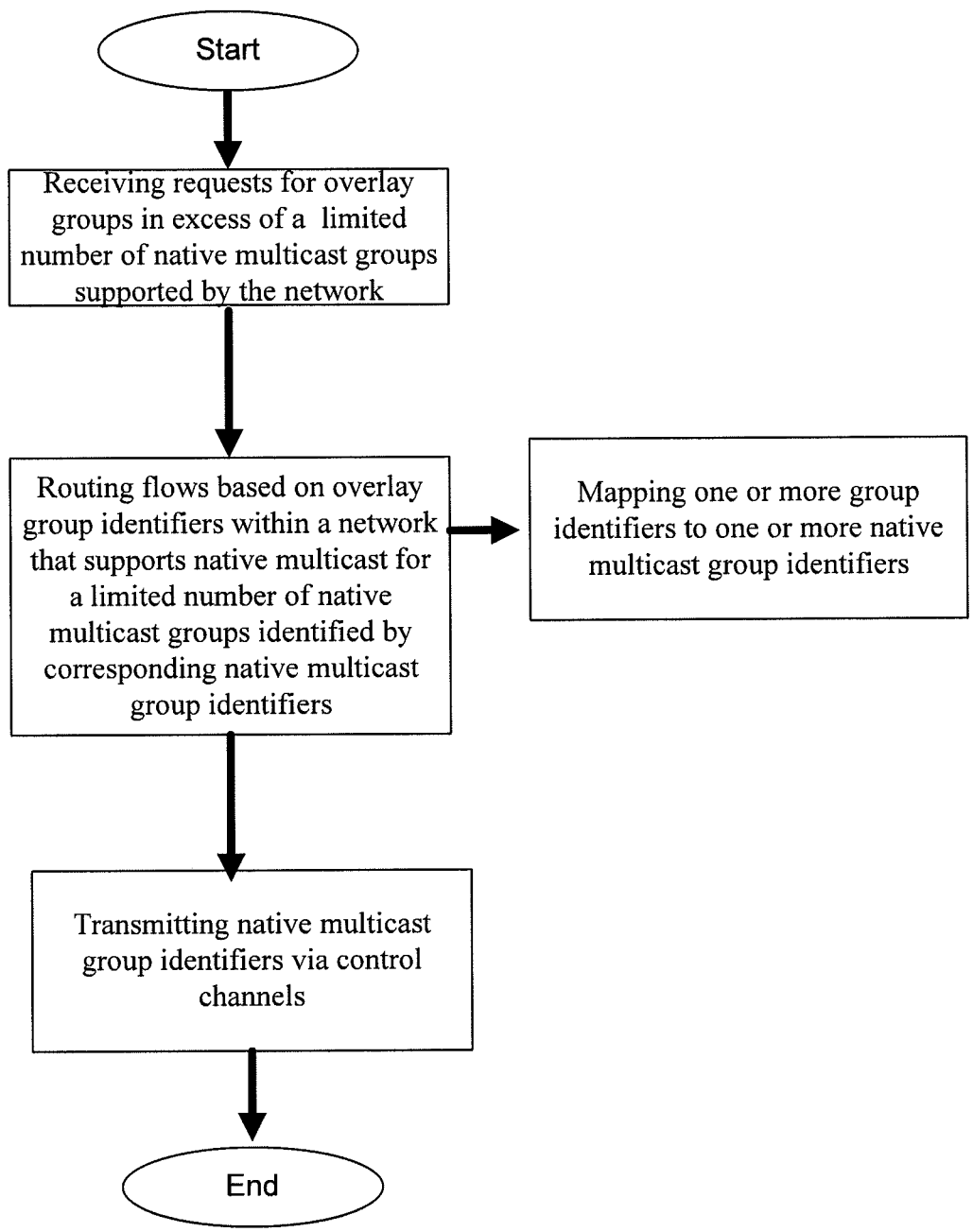
FIG. 13 shows a flow chart for a method that routes flows via multicast flow transport for groups according to one embodiment of the invention.

According to another aspect of the present invention, a system routes flows for one or more groups via transit routers comprising one or more processing units that run one or more overlay processes that route one or more flows based on overlay group identifiers. According to this embodiment, the number of requested overlay groups by the access nodes exceeds the limited number of native multicast groups supported by the network. The overlay processes utilize a mapping service that maps overlay group identifiers to native multicast group identifiers, as shown in the flow chart of FIG. 13. The mapping service can involve a random hash function. Alternatively, the mapping service creates clusters of logical groups of access nodes and maps each cluster of logical groups to native multicast groups.

More specifically, when the number of simultaneous logical multicast groups exceeds the number of simultaneous IP-multicast groups supported by the switch, multiple logical overlay groups are aggregated into a single IP-multicast group. (i.e., a set of overlay group identifiers will be translated to a single IP multicast group identifier). In this way, access nodes may receive messages for logical groups they do not belong to on IP-multicast groups they have joined. In such a case, the access node filters out the messages it receives on the IP multicast group that belong to logical multicast groups it has not joined. The mapping function that assigns logical multicast groups to IP-multicast groups can be optimized for efficient use of the bandwidth.

In an exemplary embodiment, two functions are used to provide a mapping that assigns logical overlay multicast group identifiers to IP-multicast group identifiers. The first is RandomHashMap( ) which takes three parameters: the overlay group name (considered as a string of 20 characters representing the multicast name in standard internet dotted-quad notation); a random seed value HashSeed which is constant for a particular set of transit routers and access nodes, but may be different for a distinct set of transit routers and access nodes located on a different local area network; and a maximum number of groups denoted MaxIPGroups (determined by the number of IP multicast groups a specific switch supports). The function takes these 3 inputs and applies a randomized hash function to them to generate one IP-multicast group address. For a particular set of RandomSeed and MaxIPGroups parameters this function will map all possible logical multicast group names to a set of MaxIPGroups valid IP-multicast group names. Through the use of a random hashing function each overlay group name will have an equal likelihood to map to any of the possible IP-multicast groups and so they will be evenly distributed over the set of all possible groups. This will result in equal loading of each IP-multicast group and will cause expected case inefficiency ratios of NumLogicalGroups/MaxIPGroups −1. The best-case inefficiency is 0, but this is unlikely when NumLogicalGroups approaches MaxIPGroups, as it requires a very specific mapping of overlay groups to IP-multicast groups, which will not be provided by a random function. The worst-case inefficiency would be if the function mapped all of the overlay groups to only 1 IP-multicast group so nodes could have inefficiency ratios as high as NumLogicalGroups −1 if they were only interested in one group.

The second function is ClusteredMap( ) ClusteredMap( ) for example, is run only on the transit routers and consults the state knowledge, shared between all transit routers in the site, regarding which overlay groups each access node is currently serving. Using this shared knowledge, the ClusteredMap function clusters sets of overlay groups with high overlap of interested access nodes amongst them, mapping each of these sets of logical groups onto a single IP-multicast group. This results in the access node being able to use almost all of the logical group flows that are delivered to a specific IP-multicast group it receives, and thus, better reduces the inefficiency compared with the RandomHashMap function.

In an exemplary embodiment, upon a join of an access node to an overlay group, the relevant transit router determines the mapping of that group to an IP multicast group using the ClusteredMap( ) function and sends the resulting IP multicast group name over the reliable channel back to the access node so that it can join the corresponding IP multicast group (at layer 3) if it is not yet joined (at layer 3) to that group. Upon an access node leaving an overlay group, it leaves the corresponding IP multicast group only if it has no other active overlay group that maps to the same IP multicast group.

In an exemplary embodiment, when only a single access node is currently interested in the flow, the relevant transit router can optimize and send the flow over unicast UDP, instead of IP-multicast, with the address of the relevant access node as the destination. Alternatively, the transit router can use a reliable channel to this access node (e.g., the reliable channel that is maintained for the join and leave notifications) in order to send the flow of data.

From the foregoing it would be appreciated that the overlay network described above that uses IP multicast will improve it's scalability in delivering flows to many receivers. This is done by using the network level multicast to efficiently deliver many flows of content to a large number of receiver nodes, while maintaining the overlay network semantics and services and while maintaining direct knowledge by the overlay of every receiver node. In pure IP multicast systems, the sender and the network routers and software do not know what the complete set of receiver nodes is, as for scalability purposes, that information is distributed and only known by the direct neighbors of any receiver nodes.

The present invention uses a control channel where the choice of group is not determined by the receiver nodes. Rather the choice is determined by the overlay process or router that informs the receiver node through the control channel of assigned group. The present invention supports more groups than the amount of groups that the switching and routing hardware actually supports at the same time (not withstanding the IP multicast theoretical group space of $2^{24}$ addresses). For example, certain switches support only a limited number of multicast groups simultaneously transmitting without triggering high message loss or reverting to sending all multicasts as broadcasts. The mapping according to the invention allows for efficient sharing of the limited number of native simultaneous groups among a large number of active overlay groups. Since the number of groups is limited, it is possible for a receiver to receive packets on the native multicast group that belong to overlay groups in which that receiver is not interested as those overlay groups share the same native multicast group. However, the mappings of the invention facilitate minimizing this overhead. Moreover, this sharing does not contribute to any additional packet loss or switch overload (which would occur if the switch had to process more different multicast groups than it can support in hardware).

The present invention also connects parallel overlays with native multicast groups for selective delivery of the flows on the parallel overlay networks. When parallel overlay networks share the same native multicast network they must coordinate between themselves to manage the shared resource of IP multicast group identifiers and the current mapping between overlay groups and native multicast groups, which may not always be 1-1. If they did not, then two overlay networks could each map different overlay groups to the same native multicast group and thereby increase the inefficiency of the mapping (more access nodes receive messages for flows in which they are not interested). Even worse, if each overlay network created it's own mapping, when the number of IP multicast groups was constrained because of switch capabilities, the total number of IP multicast groups created could be greater then the switch capacity resulting in the switch dropping messages or reverting to broadcast (which could cause even worse loss or prevent access nodes from receiving all of the flows in which they are interested).

The invention claimed is:

1. A system that routes one or more flows within a network that provides multicast flow transport for one or more groups, comprising:
   one or more transit routers comprising one or more processing units that run one or more overlay processes associated with parallel overlay networks that route one or more flows based on overlay group identifiers;
   one or more access nodes issuing requests for one or more overlay groups in order to receive flows from said one or more transit routers, said one or more access nodes and said transit routers together being on a network that supports native multicast service, wherein the overlay processes utilize a mapping service that maps overlay group identifiers to native multicast group identifiers;

a communication system that shares mapping information between at least two overlay processes that maintain at least two parallel overlay networks; and a control channel between said one or more access nodes and said one or more transit routers, wherein said one or more access nodes request one or more overlay group identifiers and said one or more transit routers transmit one or more native multicast group identifiers via said control channel.

2. The system of claim 1, wherein said mapping service uses a static map such that no two of said one or more overlay group identifiers are mapped to the same one of said one or more native multicast group identifiers.

3. The system of claim 1, wherein said mapping service comprises a random hash function.

4. The system of claim 1, wherein said mapping service maps an overlay group identifier to a native multicast group identifier based on the usage of overlay groups in at least some of the overlay networks of the parallel overlay networks.

5. A system that routes one or more flows within a network that provides multicast flow transport for one or more groups, comprising:

one or more transit routers comprising one or more processing units that run a plurality of overlay processes maintaining a plurality of overlay networks that route one or more flows based on overlay group identifiers;

one or more access nodes issuing requests for one or more overlay groups in order to receive flows from said one or more transit routers, said one or more access nodes and said transit routers together being on a network that supports native multicast for a limited number of native multicast groups identified by corresponding native multicast group identifiers, wherein the number of requested overlay groups exceeds the limited number of native multicast groups supported by the network, wherein the plurality of overlay processes utilize a mapping service that maps one or more overlay group identifiers to one or more native multicast group identifiers, wherein state information associated with the plurality of overlay networks is shared amongst the plurality of overlay processes and the mapping service; and a control channel between said one or more access nodes and said one or more transit routers, wherein said one or more access nodes request one or more overlay groups and said one or more transit routers transmit one or more native multicast group identifiers via said control channel.

6. The system of claim 5, wherein said mapping service comprises a random hash function.

7. The system of claim 5, wherein said mapping service creates clusters of logical groups of said one or more access nodes and maps each of said cluster of logical groups to one of said one or more native multicast groups.

8. A method of routing one or more flows within a network that provides multicast transport for one or more groups comprising:

a) receiving requests for one or more overlay groups via one or more control channels;

b) routing one or more flows based on overlay group identifiers identifying one or more overlay groups within a network that supports native multicast based on native multicast group identifiers, said routing comprising i) mapping one or more overlay group identifiers to one or more native multicast group identifiers; and ii) sharing mapping information between at least two overlay processes that maintain at least two parallel overlay networks;

c) transmitting one or more native multicast group identifiers via said one or more control channels.

9. The method of claim 8, wherein said mapping service uses a static map such that no two of said one or more overlay group identifiers are mapped to the same one of said one or more native multicast group identifiers.

10. The method of claim 8, wherein said mapping service comprises a random hash function.

11. The method of claim 8, wherein said mapping service maps an overlay group identifier to a native multicast group identifier based on the usage of overlay groups in at least some of the overlay networks of the parallel overlay networks.

* * * * *

UNITED STATES PATENT AND TRADEMARK OFFICE
CERTIFICATE OF CORRECTION

Page 1 of 1

PATENT NO.        : 8,599,851 B2
APPLICATION NO.   : 12/753459
DATED             : December 3, 2013
INVENTOR(S)       : Amir et al.

It is certified that error appears in the above-identified patent and that said Letters Patent is hereby corrected as shown below:

On the Title Page of the Letters Patent after item "(65) Prior Publication data. US 2011/0243131 A1 Oct. 6, 2011" add:

<u>Related U.S. Application Data</u>

<u>(60) Provisional application No. 61/166,459, filed on Apr. 3, 2009</u>

In the Specification,

Column 1, line 12, replace:

61/664,459 with 61/166,459

Signed and Sealed this
Tenth Day of February, 2015

Michelle K. Lee
*Deputy Director of the United States Patent and Trademark Office*